(12) United States Patent
Koyama et al.

(10) Patent No.: US 7,598,925 B2
(45) Date of Patent: Oct. 6, 2009

(54) INFORMATION DISPLAY AND INFORMATION DISPLAY SYSTEM

(75) Inventors: Fumio Koyama, Hara-mura (JP);
Yoshiyuki Kodama, Chino (JP);
Tomohiro Mukai, Suwa (JP)

(73) Assignee: Seiko Epson Corporation (JP)

( * ) Notice: Subject to any disclaimer, the term of this patent is extended or adjusted under 35 U.S.C. 154(b) by 535 days.

(21) Appl. No.: 11/062,309

(22) Filed: Feb. 18, 2005

(65) Prior Publication Data

US 2005/0200559 A1 Sep. 15, 2005

(30) Foreign Application Priority Data

Feb. 24, 2004 (JP) .............................. 2004-048377

(51) Int. Cl.
*G09G 5/00* (2006.01)

(52) U.S. Cl. ....................................... 345/1.1; 345/204

(58) Field of Classification Search .................. 345/1.1, 345/901, 903, 905, 204; 705/14; 359/296; 704/104.1
See application file for complete search history.

(56) References Cited

U.S. PATENT DOCUMENTS

| | | | |
|---|---|---|---|
| 3,973,341 A * | 8/1976 | Kent, Jr. ................. | 40/124.191 |
| 5,534,888 A * | 7/1996 | Lebby et al. ................. | 345/672 |
| 5,537,126 A | 7/1996 | Kayser et al. | |
| 5,736,967 A | 4/1998 | Kayser et al. | |
| 6,181,299 B1 | 1/2001 | Frederick et al. | |
| 6,249,263 B1 | 6/2001 | Kayser et al. | |
| 6,266,052 B1 | 7/2001 | Kayser et al. | |
| 6,271,807 B1 | 8/2001 | Kayser et al. | |
| 6,448,958 B1 * | 9/2002 | Muta .......................... | 345/169 |
| 2002/0055938 A1 * | 5/2002 | Matsuo et al. ........... | 707/104.1 |
| 2003/0020701 A1 * | 1/2003 | Nakamura et al. .......... | 345/204 |
| 2004/0155833 A1 * | 8/2004 | Ishii et al. ..................... | 345/1.1 |

FOREIGN PATENT DOCUMENTS

| | | |
|---|---|---|
| JP | 2002-169190 | 6/2002 |
| JP | 2003-256134 | 9/2003 |
| JP | 2003-256383 | 9/2003 |
| WO | WO 03/098374 A2 | 11/2003 |

OTHER PUBLICATIONS

Communication from related PCT application No. PCT/JP2005/002745, Apr. 26, 2005.

* cited by examiner

*Primary Examiner*—Amare Mengistu
*Assistant Examiner*—Yuk Chow
(74) *Attorney, Agent, or Firm*—Harness, Dickey & Pierce, P.L.C.

(57) ABSTRACT

In the case where processing is implemented in a medium mode, by interconnecting connectors 10 and 28, processing of information to be displayed on a memory type display panel 2 is implemented by a host display processing device 21; in the case where processing is implemented in a stand-alone mode, by disconnecting the connectors 10 and 28 from each other, processing of information to be displayed on the memory type display panel 2 is implemented by an information display sheet 1 itself.

19 Claims, 3 Drawing Sheets

F I G. 1
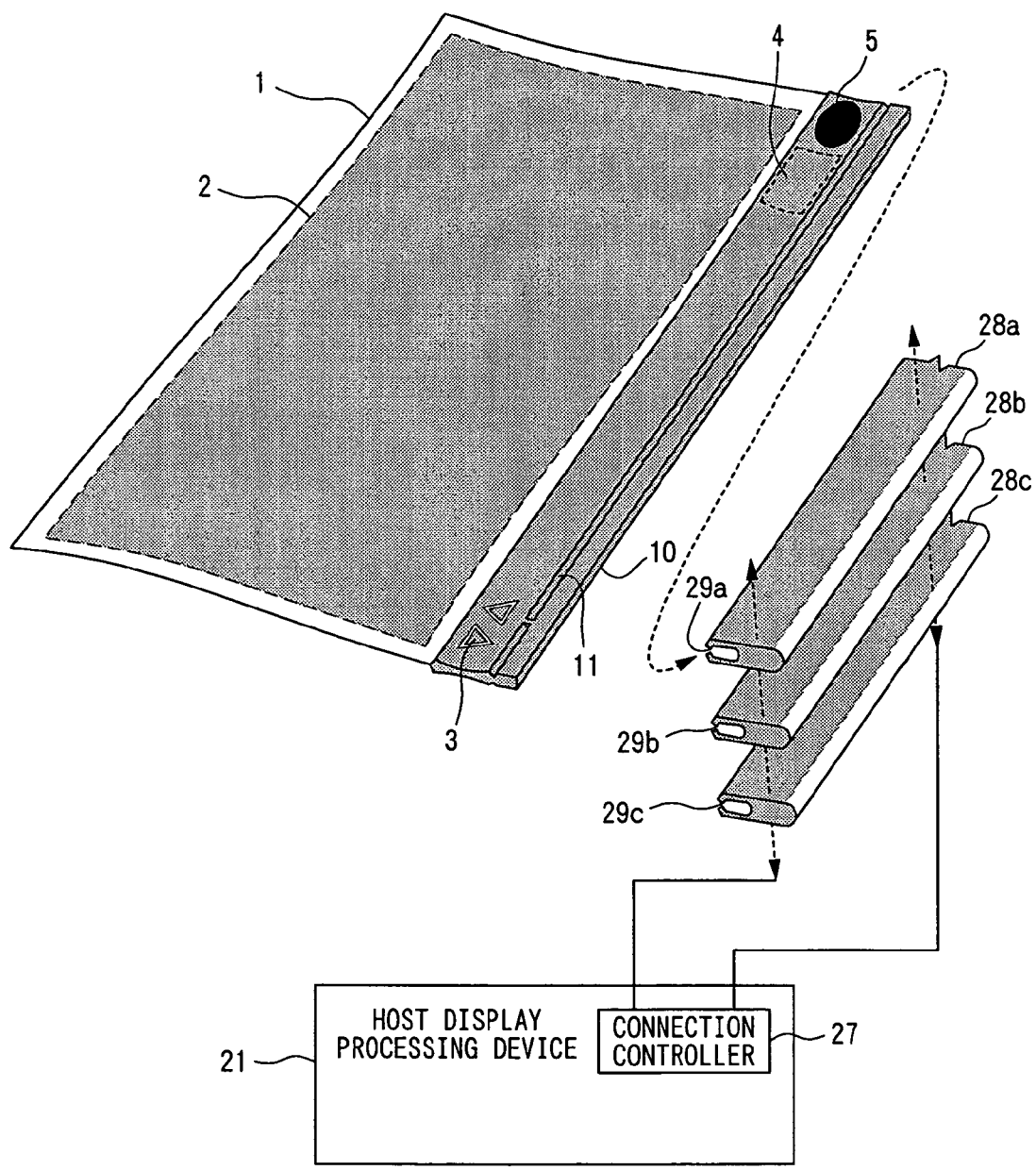

INFORMATION DISPLAY AND INFORMATION DISPLAY SYSTEM

BACKGROUND OF THE INVENTION

1. Field of the Invention

The present invention relates to information displays and information display systems and, more particularly, to those suitably applicable to information display sheets such as electronic paper.

2. Description of the Related Art

As far as printing of information on paper (so-called hardcopy) is concerned, because it has already been used over a long period of time and has repeatedly been improved, superior printing technologies for this kind of printing have been established. However, because hardcopied information is in a state of being fixed to paper, it is difficult to carry out information alteration, information erasure, and utilization of hardcopied information, as electronic information.

Meanwhile, with regard to displaying of information on a display (so-called softcopy), thinning of displaying devices has been promoted, and, with regard to their displaying capability, high resolution and high contrast have been realized. In particular, in recent years, based on new principles of display, a lightened and thinned displaying medium has been developed that is referred to as "electronic paper" and can hold without dissipating electric power natural display made by means of a reflection method or the like, whereby quality of display close to that of a hardcopy has been acquired.

For example, in Japanese Patent Laid-Open No. 2002-169190, a method is disclosed for realizing electronic paper that enables printing out of the office and that is convenient to carry, by forming on a flexible board a displaying area by means of electrophoretic dispersion liquid.

However, even if such electronic paper is provided as a displaying medium, simple and convenient handling of the electronic paper as is the case with paper is not readily realized. In other words, if lightening, thinning, and tractability are emphasized, it becomes impossible to assign the electronic paper high-performance processing ability. Accordingly, it becomes impossible to perform diverse processing of document data that is subject to high-level information processing in recent years.

In contrast, if high-level and diverse processing ability is assigned to electronic paper, a high-performance processor and an electric power source that can supply electric power corresponding to the high performance are required. Accordingly, in addition to preventing the electronic paper from being lightened and thinned, there has been a problem in that it is impossible to use the electronic paper, for example, for referring to multiple pages at one time, as is the case with paper.

Therefore, it is an object of the present invention to provide information displays and information display systems that can add high-level information-processing ability, while allowing the tractability of display devices to be enhanced.

SUMMARY OF THE INVENTION

In order to solve the foregoing problems, an information display according to an aspect of the present invention is characterized by comprising a displaying device for display information, an autonomous processing section for autonomously processing information to be displayed on the displaying device, and a heteronomous processing section for making others process information to be displayed on the displaying device, based on a load on processing of information to be displayed on the displaying device.

Accordingly, without providing a high-performance processor in the information display itself, provision is made for the displaying device to display information and, as may be necessary, for an outer device to implement high-level information processing. Therefore, provision is made for accommodating diverse processing of document data that is subject to high-level information processing, while allowing the information display to be lightened and thinned, and provision is made for adding high-level information-processing ability to the information display, while enabling the enhancement of the tractability of the information display.

An information display according to an aspect of the present invention is characterized by further comprising a connector for detachably and attachably connecting the displaying device having the autonomous processing section and the heteronomous processing section and for transferring outward a processing request to heteronomously implement processing of information, the connector being formed integrally with the displaying device.

Accordingly, provision is made for the information display alone to display and, as may be necessary, for an outer device to implement high-level information processing, whereby the diverse processing of document data that is subject to high-level information processing can also be accommodated, with the convenience, such as portability of the information display, being maintained.

An information display according to an aspect of the present invention is characterized by further comprising an information storing section for storing information to be processed heteronomously.

Accordingly, even when the information display operates alone, information processed heteronomously can be prevented from being lost, whereby processing that cannot be implemented by the information display alone can readily be assigned to an outer device.

An information display according to an aspect of the present invention is characterized by further comprising a processing request storing section for storing a processing request issued to the heteronomous processing section, based on a load on the autonomous processing section.

Accordingly, in the case where the information display operates alone, even when an operation requesting processing that cannot be implemented by the information display alone, processing corresponding to the operation can readily be assigned to an outer device.

An information display according to an aspect of the present invention is characterized in that the displaying device is sheet-like.

Accordingly, the information display sheets can be handled being stacked on top of the other, while making the information display hold flexibility. Therefore, it is possible to make the information display implement information processing that cannot be realized with paper, while making the information display hold tractability similar to that of paper.

An information display according to an aspect of the present invention is characterized in that the displaying device is a memory type display panel.

Accordingly, without being provided with electric power, the displaying device can hold information displayed thereon, as it is. As a result, provision is made for power dissipation of the information display to be reduced, thereby enabling reduction in the capacity of a battery provided in the information display; therefore, lightening and thinning of the information display can be implemented.

An information display system according to an aspect of the present invention is characterized by comprising an information display sheet for displaying information that the information display sheet autonomously processes, a host display processing device for processing the information to be displayed on the information display sheet, and connector for connecting the information display sheet to the host display processing device in a detachable and attachable manner.

Accordingly, without providing a high-performance processor in the information display sheet itself, provision is made for the information display sheet alone to display and, as may be necessary, for the host display processing device to implement high-level information processing. Therefore, provision is made for accommodating diverse processing of document data that is subject to high-level information processing, while allowing the information display sheet to be lightened and thinned, and provision is made for adding high-level information-processing ability to the information display sheet, while enabling the enhancement of the tractability of the information display sheet.

An information display system according to an aspect of the present invention is characterized in that the information processing ability of the host display processing device is higher than that of the information display sheet.

Therefore, it is not necessary to provide a high-performance processor in the information display sheet itself, and provision is made for accommodating diverse processing of document data that is subject to high-level information processing, and provision is made for adding high-level information-processing ability to the information display sheet, while allowing the information display sheet to be lightened and thinned.

An information display system according to an aspect of the present invention is characterized in that, when a processing request that cannot be autonomously processed is issued, the information display sheet itself holds the processing request therein.

Accordingly, in the case where the information display sheet is operated alone, even when an operation requesting processing that the information display sheet alone cannot implement is carried out, the information display sheet can make the host display processing device implement the processing corresponding to the operation that has been implemented in the information display sheet, at the timing when the information display sheet has been connected to the host display processing device. Therefore, it is not necessary to keep the information display sheet being always connected with the host display processing device, in order to make the host display processing device implement the processing that the information display sheet alone cannot implement; whereby the diverse processing of document data that is subject to high-level information processing can also be accommodated, with the convenience of the information display sheet, such as portability, being maintained.

An information display system according to an aspect of the present invention is characterized in that, when a processing request that cannot be autonomously processed is issued, the information display sheet requests the host display processing device to implement processing.

Therefore, without providing a high-performance processor in the information display sheet itself, provision is made for accommodating diverse processing of document data that is subject to high-level information processing, and provision is made for adding high-level information-processing ability to the information display sheet, while allowing the information display sheet to be lightened and thinned.

An information display system according to an aspect of the present invention is characterized in that, when a processing request that cannot be autonomously processed is issued, the information display sheet implements display urging connection thereof with the host display processing device.

Accordingly, it is possible to readily notify the user that a processing request that cannot be autonomously processed has been issued and when the information display sheet should be connected to the host display processing device.

An information display system according to an aspect of the present invention is characterized in that a secondary battery is provided in the information display sheet and is charged through the connector.

Accordingly, it is possible to make the host display processing device implement processing of information and charge the secondary battery provided in the information display sheet, thereby reducing time and efforts.

An information display system according to an aspect of the present invention is characterized in that the connector can connect a plurality of information display sheets thereto.

Accordingly, it is possible to handle the information display sheets on top of the other and to look at contents displayed on the information display sheets, while turning over the information display sheets; it is also possible to make the information display sheets implement information processing that cannot be realized with paper.

An information display system according to an aspect of the present invention is characterized in that the connector can connect disparate information display sheets thereto.

Accordingly, various functions can be distributed to the information display sheets, and, even when the spaces of the information display sheets are limited, high-level information processing and operationality can be realized.

An information display system according to an aspect of the present invention is characterized in that the information display sheets each can communicate with the others through the connector.

Accordingly, it is possible to make the information display sheets operate in cooperation with each other, whereby contents of an information display sheet can be shared by the information display sheets, and information can readily be moved between the information display sheets.

An information display system according to an aspect of the present invention is characterized in that the information display sheet comprises a connection detection section for detecting connection thereof with the host display processing device, and that, when the connection of the information display sheet with the host display processing device is detected, information processing beingimplemented in the information display sheet is handed over to the host display processing device for further processing.

Accordingly, by connecting the information display sheet to the host display processing device, it is possible that information processing being implemented in the information display sheet is handed over to the host display processing device for further processing; therefore, the displaying operation of the information display sheet can be accelerated.

BRIEF DESCRIPTION OF THE DRAWINGS

FIG. 1 is a perspective view illustrating the appearance configuration of an information display system according to Embodiment 1;

DETAILED DESCRIPTION OF THE PREFERRED EMBODIMENTS

Information display systems according to the embodiments of the present invention will be described below referring to the accompanying drawings.

Figure 2:
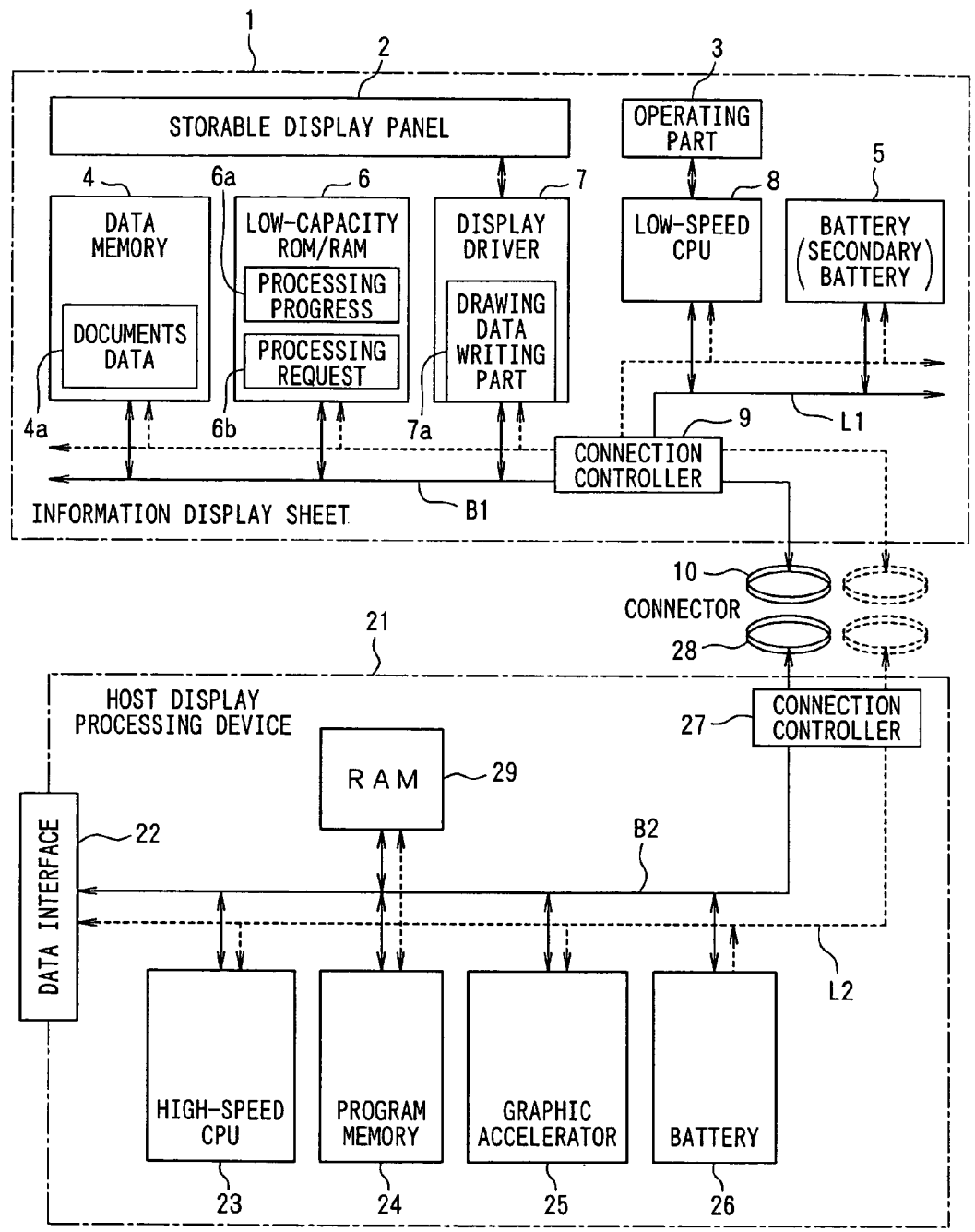
FIG. 2 is a block diagram illustrating a schematic configuration of the information display system in FIG. 1.

FIG. 1 is a perspective view illustrating the appearance configuration of an information display system according to Embodiment 1 of the present invention; and FIG. 2 is a block diagram illustrating a schematic configuration of the information display system in FIG. 1.

In FIG. 1, the information display system is provided with an information display sheet 1 for displaying information that the information display sheet autonomously processes, a host display processing device 21 for processing the information to be displayed on the information display sheet 1, and connectors 10 and 28 for connecting the information display sheet 1 to the host display processing device 21 in a detachable and attachable manner.

In this situation, the information display sheet 1 is provided with a memory type display panel 2, an operating part 3, a data memory 4, a battery 5, a low-capacity ROM/RAM 6, a display driver 7, a low-speed CPU 8, and connection controller 9. In addition, the data memory 4, the battery 5, the low-capacity ROM/RAM 6, the display driver 7, and the low-speed CPU 8 are connected to the connection controller 9 through a signal bus B1, and the data memory 4, the battery 5, the low-capacity ROM/RAM 6, the display driver 7, the low-speed CPU 8 are also connected to the connection controller 9 through a power supply line L1.

Meanwhile, the host display processing device 21 is provided with a data interface 22, a high-speed CPU 23, a program memory 24, a graphic accelerator 25, a battery 26, a connection controller 27, and a RAM 29. In addition, the data interface 22, the high-speed CPU 23, the program memory 24, the graphic accelerator 25, the battery 26, and the RAM 29 are connected to the connection controller 27 through a signal bus B2, and the data interface 22, the high-speed CPU 23, the program memory 24, the graphic accelerator 25, the battery 26, and the RAM 29 are also connected to the connection controller 27 through a power supply line L2.

In this situation, the memory type display panel 2 can be made up from an A4-size high-pixel-density (multiple-pixel) displaying device, and can display pixel data on predetermined pixels in response to the control by the display driver 7. In this regard, the memory type display panel 2 can hold a display screen even if the electric power source is cut off, whereby electric power for holding the conditions of the display screen is not required; therefore, the power dissipation of the information display sheet 1 can be lowered.

Moreover, as the display panel, for example, a display such as an electrophoretic display, a cholestic liquid crystal display, or a charged-toner display, a twist-ball-type display, or an electrodeposition-type display, can be employed, and a non-memory type display panel may be utilized in place of the memory type display panel 2.

The operating part 3 that gives various instructions to the information display sheet 1 can be configured, for example, from a touch panel.

The data memory 4 can be configured from a nonvolatile memory such as a flash memory; for example, the data memory 4 can store document data 4a described in a document format such as the XML (extensible Markup Language).

The battery 5 is configured from a primary battery or a secondary battery and can supply each portion of the information display sheet 1 with electric power.

The low-capacity ROM/RAM 6 is provided with a ROM and a RAM; the memory capacity of the low-capacity ROM/RAM 6 may be smaller than those of the program memory 24 and the RAM 29 that are provided in the host display processing device 21. In this situation, the RAM provided in the low-capacity ROM/RAM 6 can be configured from a memory such as a DRAM (Dynamic Random Access Memory), an SRAM (Static Random Access Memory), a FeRAM/FRAM (Ferroelectric Random Access Memory), and an MRAM (Magnetoresistive Random Access Memory). In addition, the low-capacity ROM/RAM 6 can store various kinds of programs for controlling the information display sheet 1, can form a work area when the low-speed CPU 8 implements processing, and can store the processing results. Moreover, when a processing request that the low-speed CPU 8 cannot autonomously process is created, the low-capacity ROM/RAM 6 can store the processing request 6b. Furthermore, the low-capacity ROM/RAM 6 can store the processing progress 6a of processing that has been performed within the host display processing device 21. In addition, as the RAM provided in the low-capacity ROM/RAM 6, an SRAM, which can hold data with low electric power dissipated, is preferable, and a nonvolatile FeRAM/FRAM or an MRAM is more preferable.

The display driver 7 can display, on the memory type display panel 2, document data 4a stored in the data memory 4, information processing results inputted by the low-speed CPU 8, and the like, by directly controlling the memory type display panel 2. The display driver 7 can also display, on the memory type display panel 2, drawing data sent through the connectors 10 and 28 by the graphic accelerator 25, information processing results sent by the high-speed CPU 23, and the like. Specifically, the display driver 7 includes a drawing data writing part 7a to which graphic data is inputted by the graphic accelerator 25. In addition, the display driver 7 can display on the memory type display panel 2 raster graphic to be drawn, by driving an X driver and a Y driver of the memory type display panel 2 while referring to drawing data inputted to the drawing data writing part 7a.

As the method for driving the memory type display panel 2, the Passive Matrix Driving method, TFT (Thin Film Transistor) method, TFD (Thin Film Diode) method, and D-TFD (Digital Thin Film Diode) method can be employed.

The low-speed CPU 8 is adapted to control the entire information display sheet 1 and can read out and implement programs that are stored in the low-capacity ROM/RAM 6 and relate to various kinds of processing, in accordance with various operating signals inputted through the operating part 3. In addition, the low-speed CPU 8 can implement processing for display on the memory type display panel 2 the document data 4a stored in the data memory 4. Moreover, the low-speed CPU 8 can store results of various processing in the low-capacity ROM/RAM 6. Here, the low-speed CPU 8 autonomously implements (hereinafter, referred to as a stand-alone mode) processing of information displayed on the memory type display panel 2; in the case where processing requests that the low-speed CPU 8 cannot autonomously process are issued or in other cases, the low-speed CPU 8 can request the host display processing device 21 to process the processing requests (hereinafter, referred to as a medium mode).

The connection controller 9 can implement switching control for connecting to or disconnecting from the host display processing device 21 the data memory 4, the battery 5, the low-capacity ROM/RAM 6, the display driver 7, and the low-speed CPU 8.

The data interface 22 is an interface to which data can be inputted from the outside of the host display processing device 21 and can be configured, for example, from the slot of a communication interface or a memory medium, or the like. Data inputted through the data interface 22 can be stored in the RAM 29 or can be sent to the information display sheet 1 through the connectors 10 and 28. In addition, in the case where the data interface 22 is the slot of a memory medium, data may be utilized after being directly read out from the memory medium inserted into the slot, without being stored in the RAM 29.

The high-speed CPU 23 controls the entire host display processing device 21 and, as may be necessary, can control the information display sheet 1. The high-speed CPU 23 can read out and implement programs stored in the program memory 24 and related to various processing and can read out and implement document data 4a stored in the data memory 4 and programs stored in the low-capacity ROM/RAM 6 and related to various processing. In addition, the high-speed CPU 23 can implement processing for displaying on the memory type display panel 2 document data 4a stored in the data memory 4 or contents data stored in the memory medium inserted into the data interface 22. Moreover, the high-speed CPU 23 can store results of various processing in the RAM 29.

The program memory 24 can be configured from a nonvolatile memory such as a flash memory and can store various programs for controlling the host display processing device 21 and for controlling the information display sheet 1.

The graphic accelerator 25 is hardware circuitry that can implement at high speed the drawing processing of an image to be displayed on the memory type display panel 2, in accordance with commands from the high-speed CPU 23. Specifically, the graphic accelerator 25 can implement processing for extending a vector graphic inputted by the high-speed CPU 23 to a raster graphic, or other processing. Moreover, the graphic accelerator 25 can output to the display driver 7 through the connectors 10 and 28 drawing data for drawing on the memory type display panel 2 a graphic to which drawing processing has been applied.

The battery 26 is configured from a primary battery or a secondary battery and can supply each part of the host display processing device 21 with electric power, can supply each part of the information display sheet 1 through the connectors 10 and 28 with electric power, and can charge the battery 5 provided in the information display sheet 1.

The RAM 29 can store data inputted through the data interface 22, can form a work area when the high-speed CPU 23 implements processing, and can store the results of the processing. In addition, as the RAM 29, an SRAM, which can hold data with low electric power dissipated, is preferable, and a nonvolatile FeRAM/FRAM or an MRAM is more preferable.

The connection controller 27 can implement switching control for connecting to, or for disconnecting from, the information display sheet 1 data interface 22, the high-speed CPU 23, the graphic accelerator 25, the battery 26, and the RAM 29.

The connector 10 is connected to the connection controller 9 through the signal bus B1 and the power supply line L1, respectively. The connector 28 is connected to the connection controller 27 through the signal bus B2 and the power supply line L2, respectively. In addition, the connectors 10 and 28 can detachably and attachably connect the information display sheet 1 to the host display processing device 21. In this situation, the connector 28 can be configured from a plurality of connectors 28a through 28c as illustrated in FIG. 1 and can connect the information display sheet 1 to each of the connectors 28a through 28c.

Moreover, as illustrated in FIG. 1, on the connector 10, a pair of grooves 11 can be provided being placed along the one end of the information display sheet 1, and on the connectors 28a through 28c, pairs of clicks 29a through 29c, respectively, can be provided being slidably inserted into the pair of grooves 11, while holding the pair of grooves 11 at both sides thereof. The connector 10 can be formed integrally with the information display sheet 1 by means of mold forming or the like.

In the case where the information display sheet 1 is connected to the host display processing device 21, the connector 10 can be slidably moved with the pair of grooves of the connector 10 being engaged with either one of the pairs of clicks 29a through 29c. Accordingly, the information display sheet 1 can be detachably and attachably connected to the host display processing device 21, and the information display sheet 1 can be stably held on the host display processing device 21.

Moreover, in the case where the signal buses B1 and B2 are interconnected through the connectors 10 and 28, for example, an electromagnetic coupling method can be utilized. For both directions, a signal can be transmitted after being serialized between the connection controllers 9 and 27. Moreover, an electromagnetic coupling method can be utilized also in the case where the power supply lines L1 and L2 are interconnected. Furthermore, the electric energy can be alternated in the connection controller 27 of the host display processing device 21, and can be rectified in the connection controller 9 of the information display sheet 1. It goes without saying that, by providing a plurality of electrodes on the sliding portions of the connectors 10 and 28, the signal buses B1 and B2 may be interconnected by means of the contact between the electrodes, and so may be the power supply lines L1 and L2.

In the case where processing is implemented in the medium mode, by interconnecting the connectors 10 and 28, the signal buses B1 and B2 are interconnected, and so are the power supply lines L1 and L2. When the signal buses B1 and B2 are interconnected, the connection controller 9 disconnects the low-speed CPU 8 and the battery 5 from the data memory 4, the low-capacity ROM/RAM 6, and the display driver 7. The connection controllers 9 and 27 connect the low-speed CPU 8 of the information display sheet 1, the battery, the data memory 4, the low-capacity ROM/RAM 6, and the display driver 7 to the signal buses B2 of the host display processing device 21 and the power supply line L2.

When the signal bus 1 of the information display sheet 1 and the power supply line L1 are connected to the signal bus B2 of the host display processing device 21 and the power supply line L2, respectively, the high-speed CPU 23 can map the data memory 4 and the drawing data writing part 7a in the address space. In addition, the high-speed CPU 23 can read out the document data 4a stored in the data memory 4 through the connectors 10 and 28 and can store the document data 4a in the RAM 29.

Moreover, the high-speed CPU 23 can implement various processing of the document data 4a, based on instructions from the operating part 3 and can take in contents data through the data interface 22. Furthermore, the high-speed CPU 23 can store in the data memory 4 the results of the information processing implemented in the high-speed CPU 23 and can make the graphic accelerator 25 draw an image to be displayed on the memory type display pane 12. When the graphic accelerator 25 creates drawing data, the high-speed CPU 23 can make the graphic accelerator 25 write the drawing data in the drawing data writing part 7a. In addition, when the drawing data has been written in the drawing data writing part 7a, the display driver 7 can display on the memory type display panel 2 the drawing data, by driving the X driver and the Y driver of the memory type display panel 2.

Moreover, after receiving contents data through the data interface 22, the high-speed CPU 23 can send the contents data and the like to the information display sheet 1 through the connectors 10 and 28, and then can make the data memory 4 store them. Furthermore, the high-speed CPU 23 may send to the information display sheet 1 parameters for the processing progress 6a (pages to be displayed and status of data development necessary to display) implemented by the host display processing device 21, and the like, and may make the data memory 4 store them. In addition, in the case processing is implemented in the medium mode, the high-speed CPU 23 may charge the battery 5 through the connecters 10 and 28.

In contrast, processing is implemented in the stand-alone mode, by disconnecting the connectors 10 and 28, the signal buses B1and B2 are disconnected, as are the power supply lines L1 and L2. When the signal buses B1 and B2 are disconnected, the connection controller 9 connects the data memory 4, the low-capacity ROM/RAM 6 and the display driver 7 to the low-speed CPU 8 and the battery 5.

When the data memory 4 of the information display sheet 1, the low-capacity ROM/RAM 6, the display driver 7, the low-speed CPU 8, and the battery 5 are connected with each other, the low-speed CPU 8 can process the document data 4a, based on an instruction by the operating part 3 and can take over processing that has been under implementation by the host display processing device 21, based on the processing progress 6a. When the low-speed CPU 8 creates drawing data, the low-speed CPU 8 can write the drawing data in the drawing data writing part 7a. In addition, when the drawing data has been written in the drawing data writing part 7a, by driving the X driver and the Y driver of the memory type display panel 2, the display driver 7 can display on the memory type display panel 2 the drawing data.

Accordingly, without providing a high-performance processor in the information display sheet 1 itself, provision is made for the information display sheet 1 alone to display and, as may be necessary, for the host display processing device 21 to implement high-level information processing. Therefore, provision is made for accommodating diverse processing of document data that is subject to high-level information processing, while allowing the information display sheet 1 to be lightened and thinned, and provision is made for adding high-level information—processing ability to the information display sheet 1, while enabling the enhancement of the tractability of the information display sheet 1.

In this regard, however, the low-speed CPU 8 may be limited in terms of what it can alone process, due to the limitation on its resources or processing speed. For example, processing such as following hyperlinks on the memory type display panel 2 may not be taken over because there is no contents data for the link destination in the information display sheet 1 or for other reasons. In order to cope with this, when the processing request 6b that the low-speed CPU 8 cannot autonomously process is created in the information display sheet 1, the low-speed CPU 8 can make the low-capacity ROM/RAM 6 store the processing request 6b.

Accordingly, in the case where the information display sheet 1 is operated alone, even when an operation requesting processing that the information display sheet 1 alone cannot implement is carried out, the information display sheet 1 can make the host display processing device 21 implement the processing corresponding to the operation that has been implemented in the information display sheet 1, at the timing when the information display sheet 1 has been connected to the host display processing device 21. Therefore, it is not necessary to keep the information display sheet 1 being always connected with the host display processing device 21, in order to make the host display processing device 21 implement the processing that the information display sheet 1 alone cannot implement; whereby the diverse processing of document data that is subject to high-level information processing can also be accommodated, with the convenience of the information display sheet 1, such as portability, being maintained.

In this regard, however, in the case where the processing request 6b that the information display sheet 1 cannot autonomously process is issued, it is preferable to display on the memory type display panel 2 a message or the like that urges the connection of the information display sheet 1 to the host display processing device 21.

In addition, in the case where processing is implemented again in the medium mode, the high-speed CPU 23 can refer to the low-capacity ROM/RAM 6 and can check whether or not the processing request 6b is stored in the low-capacity ROM/RAM 6. In the case where the processing request 6b is stored in the low-capacity ROM/RAM 6, the high-speed CPU 23, based on the processing request 6b, can implement various processing of the document data 4a and can take in contents data through the data interface 22. When the graphic accelerator 25 creates drawing data, the high-speed CPU 23 can make the graphic accelerator 25 write the drawing data in the drawing data writing part 7a. When the drawing data has been written in the drawing data writing part 7a, by driving the X driver and the Y driver of the memory type display panel 2, the display driver 7 can display on the memory type display panel 2 the drawing data. In addition, after taking in contents data and the like, based on the processing request 6b, the high-speed CPU 23 can make the data memory 4 store the contents data and the like.

Moreover, in the case where the high-speed CPU 23 process based on the processing request 6b stored in the low-capacity ROM/RAM 6, the high-speed CPU 23 may make the memory type display panel 2 display the fact. Furthermore, as may be necessary, the high-speed CPU 23 may request an acknowledgement by the user.

Figure 3:
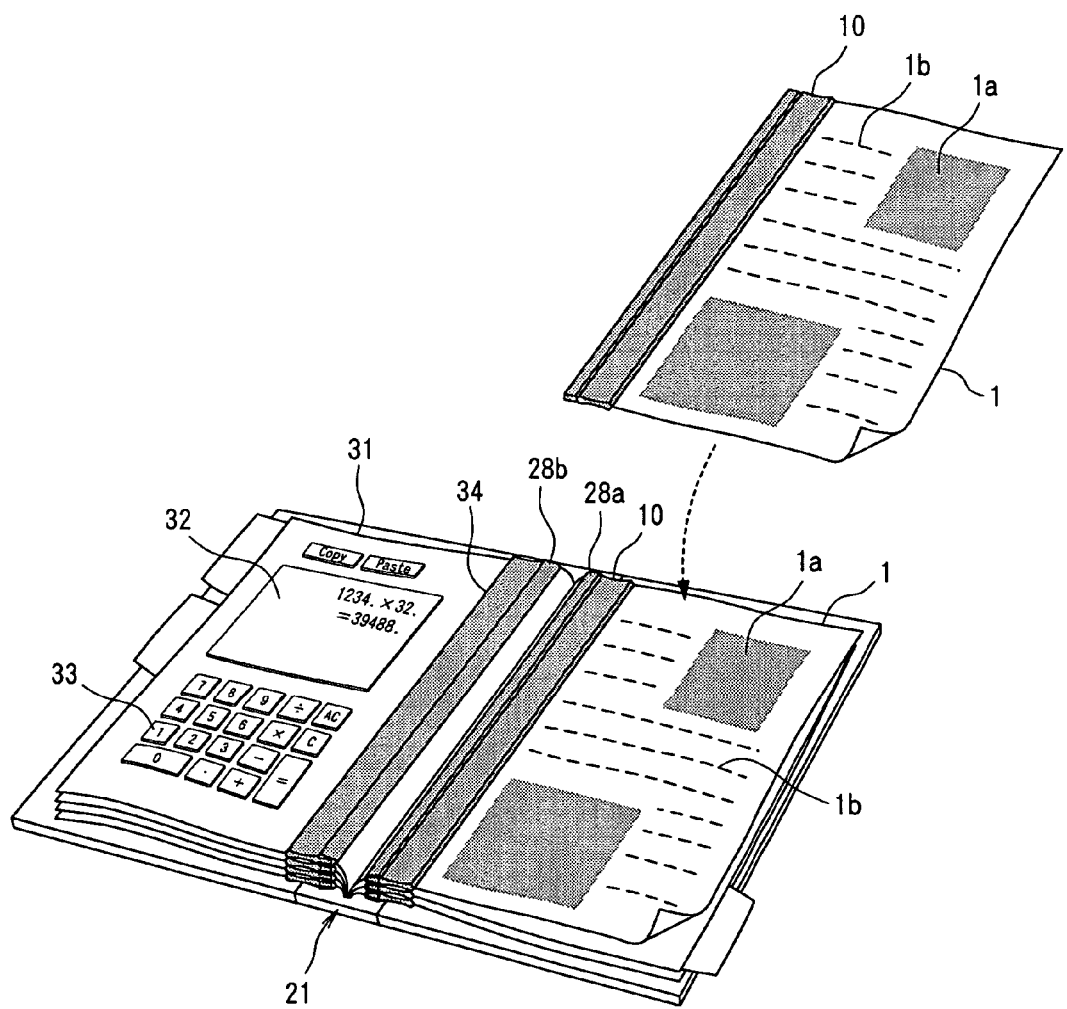
FIG. 3 is a perspective view illustrating the appearance of an information display system according to Embodiment 2.

FIG. 3 is a perspective view illustrating the appearance of an information display system according to Embodiment 2 of the present invention.

In FIG. 3, the host display processing device 21 may be configured, for example, being in a binder fashion. The connector 10 and a connector 34 are integrally mounted on the information display sheet 1 and an information display sheet 31, respectively. The information display sheet 1 can be connected to the connector 28a through the connector 10, and the information display sheet 31 can be connected to the connector 28b through the connector 34.

Accordingly, a plurality of information display sheets 1 and 31 can be connected to the host display processing device 21, and the information display sheets 1 and 31 can be handled being stacked on top of the other. Thus, it is possible to look at contents displayed on the information display sheets 1 and 31, while turning over the information display sheets 1 and 31, and it is also possible to make the information display sheets 1 and 31 implement information processing that cannot be realized with paper.

In this situation, the information display sheets 1 and 31 do not necessarily need to have the same functions, and may differ from each other in type. For example, in the information display sheet 1, the memory type display panel 2 that displays an image 1a and characters 1b may be provided approximately over the entire area, and, in the information display sheet 31, in addition to a memory type display panel 32, a touch panel 33 may be provided.

Accordingly, various functions can be distributed to the information display sheets 1 and 31, and, even when the spaces of the information display sheets 1 and 31 are limited, high-level information processing and operationality can be realized.

In addition, by utilizing the touch panel 33 and a number of the information display sheets 1 and 31, operation can be implemented while looking at the entire information of the host display processing device 21. For example, displaying a list of contents stored in the information display sheets 1 and 31 and copying or exchanging these contents between the information display sheets 1 and 31 can be performed.

INDUSTRIAL APPLICABILITY

An information display according to the present invention enables lightning and thinning thereof and can accommodate diverse processing of documents data that is subject to high-level information processing, thereby being able to be used as an information display sheet such as electric paper.

The invention claimed is:

1. An information display comprising:
a displaying device which displays information;
a low-speed CPU configured to control an entirety of the information display, reads out and implements programs, and includes an autonomous processing section and a heteronomous processing section;
a data memory configured from a nonvolatile memory and stores document data;
a display driver which displays document data stored in the data memory, and information processing results inputted by the low-speed CPU on the displaying device; and
a connector which detachably and attachably connects the information display having the autonomous processing section and the heteronomous processing section to an outer device outside of the information display and which transfers a processing request to the outer device to heteronomously implement processing of information,
the autonomous processing section autonomously processing the information to be displayed on the displaying device and the heteronomous processing section causing the outer device to process the information to be displayed on the displaying device based on a load on processing of the information to be displayed on the displaying device.

2. The information display according to claim 1, wherein the connector is formed integrally with the displaying device.

3. The information display according to claim 1, further comprising an information storing section which stores the information to be processed heteronomously by the outer device.

4. The information display according to claim 1, further comprising a processing request storing section which stores a processing request issued to the heteronomous processing section, based on the load on the autonomous processing section.

5. The information display according to claim 1, wherein the displaying device includes a sheet-like displaying device.

6. The information display according to claim 1, wherein the displaying device includes a memory type display panel.

7. An information display system comprising:
an information display sheet which displays information processed autonomously within the information display sheet;
a host display processing device which processes information to be displayed on the information display sheet; and
a connector which detachably and attachably connects the information display sheet to the host display processing device,
wherein the information display sheet includes:
a low-speed CPU which is adapted to control an entirety of the information display sheet, reads out and implements programs, and requests the host display processing device to process an issued processing request when the issued processing request cannot be autonomously processed by the information display sheet based on a load on processing of the information processed autonomously within the information display sheet,
a data memory in the information display sheet and which is configured from a nonvolatile memory and stores document data, and
a display driver in the information display sheet and which displays document data stored in the data memory, and information processing results inputted by the low-speed CPU on the information display sheet.

8. The information display system according to claim 7, wherein an information processing ability of the host display processing device is greater than an information processing ability of the information display sheet.

9. The information display system according to claim 7, wherein the information display sheet includes a request section that holds the issued processing request therein when the issued processing request cannot be autonomously processed by the information display sheet.

10. The information display system according to claim 7, wherein, when the processing request that cannot be autonomously processed by the information display sheet is issued, the information display sheet implements display urging connection thereof with the host display processing device.

11. The information display system according to claim 7, wherein the information display sheet includes a secondary battery that is charged through the connector.

12. The information display according to claim 7, wherein the connector connects a plurality of information display sheets thereto.

13. The information display according to claim 12, wherein the connector connects disparate information display sheets thereto.

14. The information display system according to claim 12, wherein at least one of the information display sheets communicates with the host display processing device through the connector.

15. The information display system according to claim 7, wherein the information display sheet comprises a connection detection section which detects the connection thereof with the host display processing device,
and wherein, when the connection with the host display processing device is detected, information processing being implemented in the information display sheet is handed over to the host display processing device for further processing.

16. An information display, comprising:
a displaying device which displays information;

a low-speed CPU which is adapted to control an entirety of the information display, reads out and implements programs, and includes a controller configured to autonomously process the information to be displayed on the displaying device;

a data memory which is configured from a nonvolatile memory and stores document data, a display driver which displays document data stored in the data memory, and information processing results inputted by the low-speed CPU on the displaying device; and a connector which detachably and attachably connects the information display to an outer device outside of the information display, and transfers a processing request to the outer device to heteronomously implement the processing of the information by the outer device, wherein the controller causes the outer device to process the information to be displayed on the displaying device based on a load on processing of the information to be displayed on the displaying device.

17. The information display according to claim 16, wherein the connector is formed integrally with the displaying device.

18. The information display according to claim 16, further comprising a memory which stores the information to be processed heteronomously by the outer device.

19. The information display according to claim 16, further comprising a memory which stores a processing request issued for heteronomous processing based on the load on the controller.

* * * * *

UNITED STATES PATENT AND TRADEMARK OFFICE
CERTIFICATE OF CORRECTION

PATENT NO. : 7,598,925 B2  Page 1 of 1
APPLICATION NO. : 11/062309
DATED : October 6, 2009
INVENTOR(S) : Koyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this

Twenty-eighth Day of September, 2010

David J. Kappos
*Director of the United States Patent and Trademark Office*